United States Patent [19]

Lanoie

[11] 4,068,570

[45] Jan. 17, 1978

[54] APPARATUS FOR PRODUCING PIECES OF EGGS

[76] Inventor: Paul Emile Lanoie, 146, rue Principale, Upton, Quebec, Canada

[21] Appl. No.: 665,563

[22] Filed: Mar. 10, 1976

[30] Foreign Application Priority Data

Mar. 18, 1975 United Kingdom ............... 11265/75

[51] Int. Cl.² ............................................ A47J 27/04
[52] U.S. Cl. ........................................ 99/353; 99/337;
99/355; 99/427; 99/443 R; 99/448; 426/614;
426/510; 426/518; 366/147; 366/132
[58] Field of Search ................ 99/337, 353, 355, 352,
99/427, 443 R, 448; 426/614, 508, 509, 510,
518, 516; 259/43

[56] References Cited

U.S. PATENT DOCUMENTS

| | | | |
|---|---|---|---|
| 2,015,857 | 10/1935 | Leo ...................................... | 426/516 |
| 2,208,651 | 7/1940 | Wallace .................................. | 99/353 |
| 2,999,024 | 9/1961 | Stimpson et al. ..................... | 426/614 |
| 3,374,096 | 3/1968 | Knoch .................................. | 426/510 |
| 3,374,728 | 3/1968 | Owens .................................. | 99/353 |
| 3,505,948 | 4/1970 | Carre et al. ............................ | 99/353 |
| 3,624,230 | 11/1971 | Robinson .............................. | 426/614 |
| 3,764,345 | 10/1973 | Beck et al. ............................ | 426/518 |

Primary Examiner—Billy J. Wilhite
Attorney, Agent, or Firm—Alan Swabey & Co.

[57] ABSTRACT

Process of producing pieces of eggs which comprises mixing eggs to obtain a blend of egg whites and egg yolks, separately establishing a first flow of the blend and a second flow of steam under pressure, contacting the first and second flows to produce a burst of the blend of eggs and to initiate a preliminary cooking of the eggs, introducing the eggs resulting from the proceeding step into a container, allowing the eggs to remain in the container until cooking is completed and a solid mass of cooked eggs is obtained, and disintegrating the solid mass into small pieces.

6 Claims, 3 Drawing Figures

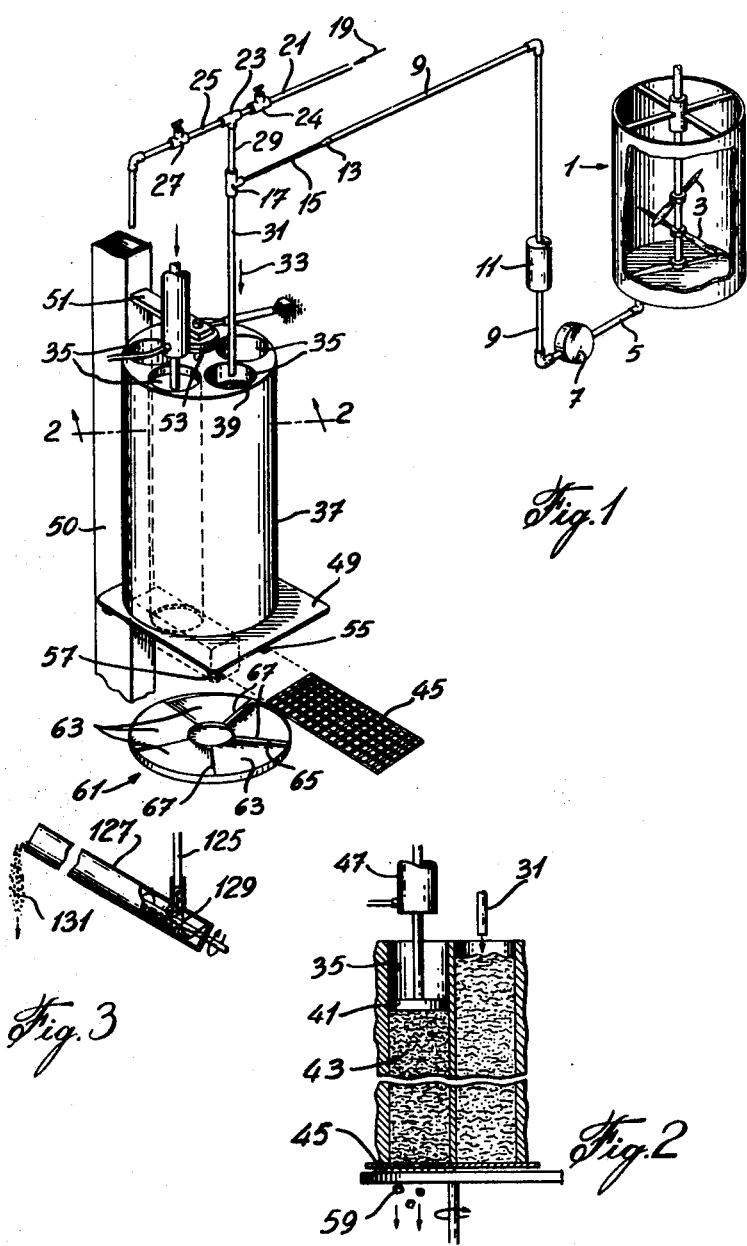

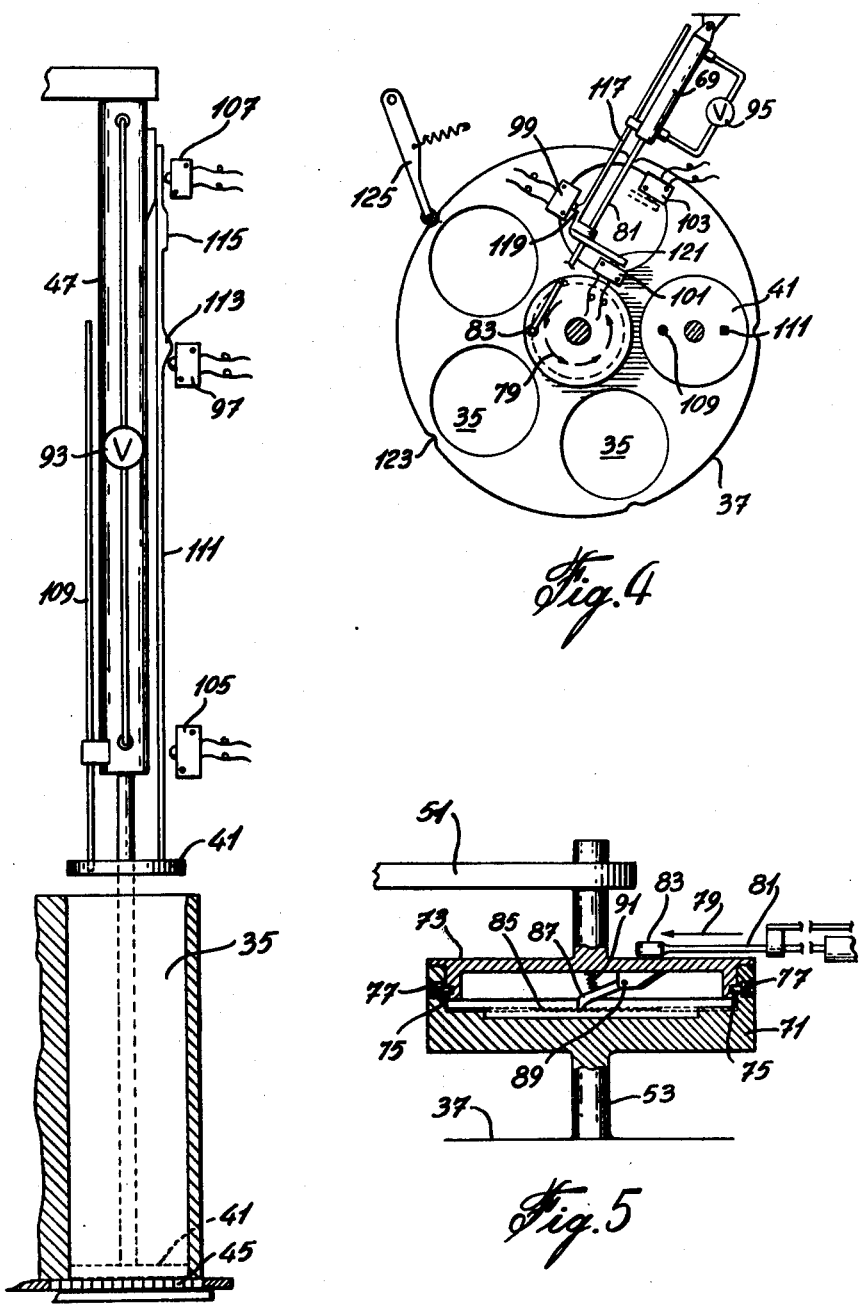

APPARATUS FOR PRODUCING PIECES OF EGGS

The present invention relates to an apparatus for producing pieces of eggs. More particularly, the invention is directed to the continuous production of pieces of eggs which are preferably of the same size and which are intended to be added to any types of food without being homogenized into the food. In this manner, a food containing these pieces of eggs will truely show the eggs present therein, and will have a real marketing value.

In the field of prepared foods for humans and also for animals, it is well-known that eggs are often added mostly for enhancing the nutritive qualities of the food. Other reasons might also be invoked for the presence of eggs in these foods, however, it is not the purpose of the present invention to discuss the reasons why eggs are added to prepared foods. However, when the presence of eggs is advertised in a particular food, such as in prepared foods, cat or dog food, the buyer should see the eggs in the food, otherwise he will simply not rely on the advertisement to the effect that eggs are present. Experience has shown that the egg pieces could be approximately $\frac{3}{8} \times \frac{3}{8} \times \frac{1}{2}$ inch or other sizes otherwise they will not be seen in the food and the buyer will not believe what is advertised on the label surrounding the food container.

It will also be realized that it would be quite difficult to simply add lumps of eggs of various sizes into the food. On the other hand, one may elect to prepare frozen eggs, which are disintegrated into small pieces and are added to a prepared food. This obviously has proven to be unsatisfactory.

In order to overcome the above disadvantages, there is now provided an apparatus by means of which it is possible to prepare egg pieces of substantially the same sizes which can be added to a prepared food and which can readily be observed when examining the food.

The production of pieces of eggs according to the invention is carried out by mixing eggs to obtain a blend of egg whites and egg yolks, separately establishing a first flow of the blend and a second flow of steam under pressure, contacting the first and second flows to produce a burst of the blend of eggs and to initiate a preliminary cooking of the eggs, introducing the eggs resulting from the proceeding step into a container, allowing the eggs to remain in the container until cooking is completed and a solid mass of cooked eggs is obtained, and disintegrating the solid mass into small pieces.

In accordance with an embodiment according to the invention, the solid mass of eggs is extruded through a die and the extruded eggs are cut into pieces of substantially the same sizes.

It is understood that mixing of the eggs to produce a blend of egg whites and egg yolks is purely conventional and can be carried out by any known means and in any known apparatus for producing such blend. The mixing is preferably carried out at room temperature.

After the blend has been produced and before being contacted with the steam, it is pumped preferably through a standard filter in order to remove pieces of egg shells which may still be present. Of course, if the blending was carried out before having removed the egg shells, the filter should be adapted to remove all the egg shell pieces, although this has not proved to be so practical.

The blend of eggs is pumped into a pipe of reasonable size, such as 1 $\frac{1}{2}$ inches diameter and which at one point substantially decreases in diameter, for example, to about $\frac{1}{2}$ inches. This will serve to completely fill the last portion of the pipe with the blend of eggs thus preventing any backlash when the blend will be reacted with steam.

It is understood that steam must of course be under pressure and a reasonable pressure has been found to be about 15 pounds per sq. inch. Contact between the steam under pressure and the blend of eggs is preferably carried out in a T wherein the blend of eggs will enter through one inlet, the steam will be introduced through another inlet and the blend of eggs which has burst under the action of steam will exit at the outlet of the T. Preferably, the diameter inside the T will be about 1 $\frac{1}{2}$ inches, it being understood that the dimensions inside the T can vary to a large extend provided the two flows can meet to produce a burst of the blend of eggs and can exit towards the container.

The time of residence of the preliminary cooked eggs in the container is about 5 minutes. This period can of course vary to a large extent, it being sufficient that the stay of the eggs in the container be long enough to make sure that the eggs are completely cooked before being extruded.

The extrusion is preferably carried out by using a piston system which pushes the solid mass out of the container through a die. The die can have various shapes but it has been found suitable to make it as a grid which will produce elements having a cross-section of for example $\frac{1}{2}$ inches by $\frac{1}{2}$ inches. Cutting can be carried out mechanically or by hand. However, using mechanical means will make sure that the egg pieces will be of substantially the same sizes.

Instead of introducing the blend of eggs into a container as mentioned above, the eggs can be introduced in a upwardly inclined cylindrical container in which there is a screw conveyor. In this manner, when the blend reaches the exit end of the upwardly inclined container, there will be obtained small particles of eggs which would mostly be suitable for readily freezing and storing. These particles, however, would not be of the same sizes and would not normally be suitable to be added to a prepared food for the purpose of showing the eggs in the food. They would be very useful as supplement to certain food requiring a certain percentage of eggs, such that which is fed to minks.

In the drawings which illustrate the invention,

FIG. 1 is a perspective diagrammatic view of an apparatus which can be used to carry out the process according to the invention;

FIG. 2 is a partial cross-section throughline 2—2 of FIG. 1 showing the interior of the container;

FIG. 3 is a view showing an alternate embodiment.

FIG. 4 is a schematic view from above of the drum and of the device which is used to locate the drum in one of five different positions;

FIG. 5 is a cross section view of the ratchet arrangement which rotates the drum; and FIG. 6 is a view of the extruding piston and of various micro-switching means.

Referring to the drawings, the apparatus first comprises a mixer 1 which is provided with any number of mixing blades 3, such as two in the embodiment illustrated, for the purpose of mixing the egg whites and egg yolks in order to produce a blend. Connected at the bottom of the mixer 1, there is an outlet pipe 5 which is connected to a pump 7, of conventional design, which in turn is connected to a pipe section 9 along with there is mounted a filter 11. The pump 7 is used to produce a continuous flow of the blend of eggs in the pipe 9, while the filter 11 will serve to remove all the particles of egg shells which may be present in the blend. For example, the blend is preferably produced by previously removing all the egg shells; however, the blend can also be produced by throwing the eggs directly into the mixer 1 after which the broken egg shells are removed using the filter 11. However, this has not proved to be as practical as when the egg shells are first separated. At 13, along the pipe section 9, there is a construction which substantially reduces the diameter of the pipe section 9 producing a pipe section 15 of smaller cross-section. For example, pipe section 9 could have a diameter of about 1 ½ inches (3.8 cm), while the section pipe 15 would have an inner diameter of about ½ inches (1.3 cm). This will enable a production of a continuous flow in pipe section 15 without any voids, thus making sure that there will be no feedback after the eggs have reacted with the steam as will be described later. The apparatus also comprises a T 17 which is connected to the pipe section 15 of reduced diameter, the purpose of which will be explained hereinafter.

The apparatus also comprises a supply of steam (not shown) which can deliver steam at a pressure of about 15 pounds per sq. inch. Obviously, the pressure of the steam can vary within a wide range depending on circumstances. This steam is fed into the apparatus along arrow 19 into a pipe 21 which is connected to a T 23. A valve 24 is mounted along pipe 21 to control the entry of vapor into T 23 via pipe section 29. Also check valves (not shown) are preferably mounted along the steam line in order to prevent a feedback of the eggs. It will be noted that T 23 may also be connected to a pipe section 25 which is provided with a closing valve 27. For the purpose of the present description, we shall assume that the valve 27 will be closed and that the T 23 will merely function as an elbow. Steam under pressure is allowed to enter the T 17 through pipe section 29.

In practice, it is preferred to have a subdivided flow of steam directly from the steam supply. This will be made possible by providing three pipe section which will all be used for directing steam into pipe 29. Along two of these three pipes there will be mounted automatic valves which will automatically close if the apparatus is shut off. The other pipe section will comprise a valve which will be hand operated for safety purposes.

It will be realized that the flow of the blend of eggs which penetrate into the T 17 through pipe section 15 and the steam which is introduced into the T 17 through pipe 29 will establish immediate contact and, because of the conditions inside the T, there will be a burst of the blend of eggs and there will obviously be obtained an initial preliminary cooking of the eggs. The preliminary cooked eggs will normally descend pipe 31 along the arrow 33 to be accumulated in one compartment 35 of the container 37. Backlash of the preliminary cooked eggs is prevented by the constriction 13, as pointed out above.

It will be noted that the container 37 which is preferably made of stainless steel, or any other non-oxidising material is elongated and cylindrical, as shown. The container 37 comprises 5 inner cylindrical compartments 35. As will be explained later, the eggs which exit from pipe 31 will be delivered and accumulated in a particular compartment 35 until the compartment is nearly filled with preliminary cooked eggs 39.

It has been stated above that the eggs should be allowed to remain in one of the compartments 35 of the container 37, for a certain period in order to enable a complete cooking of the eggs and the production of a solid mass of cooked eggs. In the embodiment illustrated, this is made possible by rotating the container 37 to five different positions as will be discussed later on.

The apparatus also comprises a piston 41 which will be used to force a solid mass of eggs 43 out of a compartment 35 through a die 45 whose dimensions vary according to needs. The piston is hydraulically operated through a hydraulic cylinder 47 and will hereinafter be referred to as a hydraulic piston.

It will be noted that the cylinder 37 is mounted on a support 49 which is held by an upright post 50. A bracket 51 is also mounted on the support 49 to hold an axle 53 which will be used to rotate the cylinder 37.

Underneath the support 49, there are two slides 55, 57 which are used to hold the die 45 in operation at the outlet of a compartment when the latter is being emptied of its contents by the hydraulic piston 41. The apparatus can also be used without the die 45 and in this case there will be obtained slices of eggs.

We have indicated above that the blend of preliminary cooked eggs should preferably remain in the container, for example, in a compartment 35, for about five minutes, before being extruded through the die 45. In order to enable the process and apparatus to operate continuously, the container 37 has been subdivided into five compartments 35. The hydraulic piston 41 and the container 37 are associated with a system of hydraulic cylinders, two valves and six micro-switches which will be described later and whereby the piston 41 completely extrudes the content of a compartment 35 while a new compartment is being filled with a fresh supply of eggs. The whole operation should last about 1 minute. Thereafter, the container 37 is rotated one step by means which will be described later and the operation which we have just described is started again. The time is adjusted so that the extrusion and the filling of the adjacent compartment last one minute. As a consequence, the eggs will remain for about five minutes in a compartment before being extruded which is amply sufficient to completely cook the eggs.

In order to cut the extruded eggs into small pieces 59, there is provided a circular cutter 61, which operates immediately underneath the die 45. The cutter 61 is provided with five upwardly slanted knives 63. Underneath each knife 63, corresponding with the side 65 opposite the cutting edge 67, there is a guard (not shown) which will be used to prevent any accumulation of particle of eggs 59 on the knife 63.

Referring particularly to FIGS. 1, 4 and 5, we will now describe how the device according to the invention can be operated continuously.

It has been mentioned above that the piston 41 is operated by a hydraulic cylinder 47. On the other hand, if we return to FIG. 4, we will see that the device also comprises another hydraulic cylinder 69. These two hydraulic cylinders 47, 69 are each controlled by a respective dual action valves adapted to operate the rod of each cylinder in one direction or the other.

Before proceeding further with the interrelation of the two hydraulic cylinders 47, 69 we must first of all give a description of the device which enables the container 37 to rotate. It has been mentioned above that there is an axle 53 which is used to rotate the cylinder 37. As shown in FIG. 1, this axle projects upwardly from the upper portion of the cylinder 37 and is solid therewith to induce it into rotation. Referring now to FIG. 5, it will be seen that there is a first disc 71 which is solid with the axle 53 and which upon rotation would cause rotation of the container 37 via axle 53. Mounted above the disc 71 is a second disc 73 which is rotatable in one direction only with respect to disc 71 and can be retained thereto by any known means such as by slot 75 and screws 77. Of course, any other known means can be used to keep the two discs in contact with one another. The idea is to induce a rotation of the container 37 from one egg recipient 35 to the next one. For this purpose, the two discs 71 and 73 are provided with a ratchet arrangement which enables the disc 73 to cause rotation of the disc 71 when it is rotated along arrow 79. However, in opposite direction there will be no rotation of the disc 71. It will be understood that the system should operate in such a manner that when the eggs in one compartment have been completely extruded, such as illustrated in FIG. 6, the piston 41 should be raised in the position illustrated in full lines in the same FIG. 6. At that particular moment the cylinder 37 should be automatically rotated until the next recipient, which is full with cooked eggs, is opposite the piston 41.

In order to induce rotation of the disc 73 in the direction indicated by arrow 79, there is provided a hydraulic cylinder 69 (FIG. 4) which has its rod 81 connected at its ends 83 to the upper surface of the disc 73. It will be realized that extension of the rod in the direction of the arrow 79 will cause rotation of the disc 73 and will induce rotation of the disc 71, consequently of the container 37. In reverse direction of the rod 81, the ratchet mechanism will prevent entrainment of the disc 71 by the disc 73.

The ratchet mechanism has been illustrated by a system of teeth 85 over which a pointed arm 87 can ride. One end of the arm 87 is articulated at 89 in a bracket 90 provided underneath the disc 73 and a spring 91 is provided to make sure that the arm 87 will rest engaged with a particular tooth 85 when the disc 71 is induced in rotation.

In order to enable the device to operate continuously and automatically there are provided as pointed out above, a dual action valve 93 for the hydraulic cylinder 47 and a valve 95 for the hydraulic cylinder 69. Also, there are provided six micro-switches 97, 99, 101, 103, 105 and 107.

Before explaining the operation of the various micro-switches it must be pointed out that the piston 41 is provided with a guide rod 109 and a micro-switch control rod 111. The micro-switch control rod 111 is provided with contacts 113 and 115 while the rod 81 of the hydraulic cylinder 69 is associated with a micro-switch control rod 117 on which there is provided a contact 119.

The operation of the device is as follows: Immediately before the piston 41 reaches the position illustrated in full lines in FIG. 6, contact 113 hits upon micro-switch 97. This switch opens up the valve 95 which causes the rod 81 to extend until it reaches the position illustrated in FIG. 4. This will cause rotation of the disc 73 in the direction indicated by the arrows 79 which in turn will cause rotation of the container 37 to a certain extent on a distance equivalent to the radial distance between two compartments 35. In this position, the contact 119 hits micro-switch 99 which will immediately reverse the direction of the valve 95 to cause retraction of the rod 81 inside the hydraulic cylinder 69. However, before this operation is initiated, it will be noted that the arm 121 which is provided at the end of the rod 117 has simultaneously hit upon micro-switch 101 which will induce the valve 93 to reverse the direction of the hydraulic piston 41. Once the rod 81 is in the retracted position, the arm 121 will hit upon micro-switch 103 which will shut off micro-switch 97 as the latter is again contacted with contact 113 in the downward motion of the piston 41. In the lowermost position of the piston 41, contact 113 will hit upon micro-switch 105 which will cause the valve 93 to reverse the direction of the piston 41.

Finally, it will be noted that there is a further micro-switch 107 which is there for security purposes. If through some malfunction of the apparatus the piston 41 keeps moving in the upward direction, the contact 115 will immediately hit upon micro-switch 107 to shut off the apparatus.

Finally, it should be noted that the upper portion of the cylinder 37 is provided with five inwardly curved members 123 and a riding arm 125. The purpose of this arrangement is to make sure that the compartment 35 is perfectly centered with respect to the piston 41.

With this arrangement, the operation of the device is very simple, it is merely sufficient to supply eggs to the mixer 1 and the rest of the operation is completely automatic. Of course, a system of conveyors should be arranged underneath the cutter 61 to receive the cut pieces of eggs.

According to an alternate embodiment, the eggs which exit from T 17 can be delivered through pipe 125 in an upward container 127 provided with a screw conveyor 129. This will enable the production of small particles of eggs 131 which as stated above, will not be of regular sizes, but which would be highly suitable for freezing and adding to prepared foods.

It is understood that this process will be mostly suitable for the preparation of egg cubes intended to be added to dog food or cat food and in this case, the eggs which would be used would be those which are unsuitable for human consumption in that the shell is not acceptable or that the egg contains blood stain. However, ordinary eggs can also be used with this process and the resulting cubes of eggs can of course be added to any food suitable for human consumption.

In addition, the process is not restricted to the production of pieces of eggs because any proteinic starting material can be used provided it can be coagulated with steam. Instead of coagulating the eggs with steam a refrigerating fluid can be used, such as $CO_2$ and there will also be obtained a mass of eggs ready for cutting in dices or slicing.

I claim:

1. An apparatus for producing pieces of eggs which comprises:
   a. a mixer for producing a blend of eggs;
   b. a source of steam under pressure;
   c. first duct means connected to said mixer, said first duct means comprising a tube having a constriction which prevents formation of voids in the flow of egg blend;
   d. second duct means connected to said source of steam;
   e. means enabling said first and second duct means to be joined whereby said blend of eggs and said steam are contacted to produce a burst of the eggs and to initiate a preliminary cooking thereof;

f. third duct means connected to said means defined in (e) to discharge the preliminary cooked eggs;

g. a container to receive the discharged eggs and to hold the same until completely cooked, said container comprising an elongated cylinder formed with a plurality of concentrically arranged cylindrical axial compartments;

h. means to cause said discharge of preliminary cooked eggs to be made alternately in said compartments;

i. means to rotate said cylinder to a next compartment when one compartment has been filled with said preliminary cooked eggs; and j. means enabling disintegration of said cooked eggs into small pieces.

2. Apparatus according to claim 1, wherein said means to cause rotation of said cylinder comprises a shaft which projects upwardly on the top portion of said cylinder, a first disc mounted in said shaft and solid with said shaft, a second freely rotatable disc mounted on said shaft above said first disc, disc ratchet means between said first and second disc, a lever connected to said second disc and adapted to circumferentially move said second disc between a forward and a rearward position, and means to cause extension and retraction of said lever.

3. Apparatus according to claim 2 wherein said means causing extension and retraction of said lever comprises a hydraulic cylinder.

4. Apparatus according to claim 3 wherein said means causing disintegration of said cooked eggs comprises a piston adapted to plunge in one said compartments loaded with cooked eggs, a die at the other end of said cylinder through which said eggs are extruded and a cutter adjacent said die to cut the extruded eggs into pieces.

5. Apparatus according to claim 4, wherein said piston is operatively connected to a second hydraulic cylinder.

6. Apparatus according to claim 5 which comprises valves for each said first and said second hydraulic cylinder and microswitching means to cause automatic operation of said apparatus so that when one said compartment is being extruded, a new compartment is being filled with eggs, when this operation is terminated, the piston is extracted from said compartment and said cylinder is rotated one step to the next compartment.

* * * * *